Patented Oct. 24, 1939

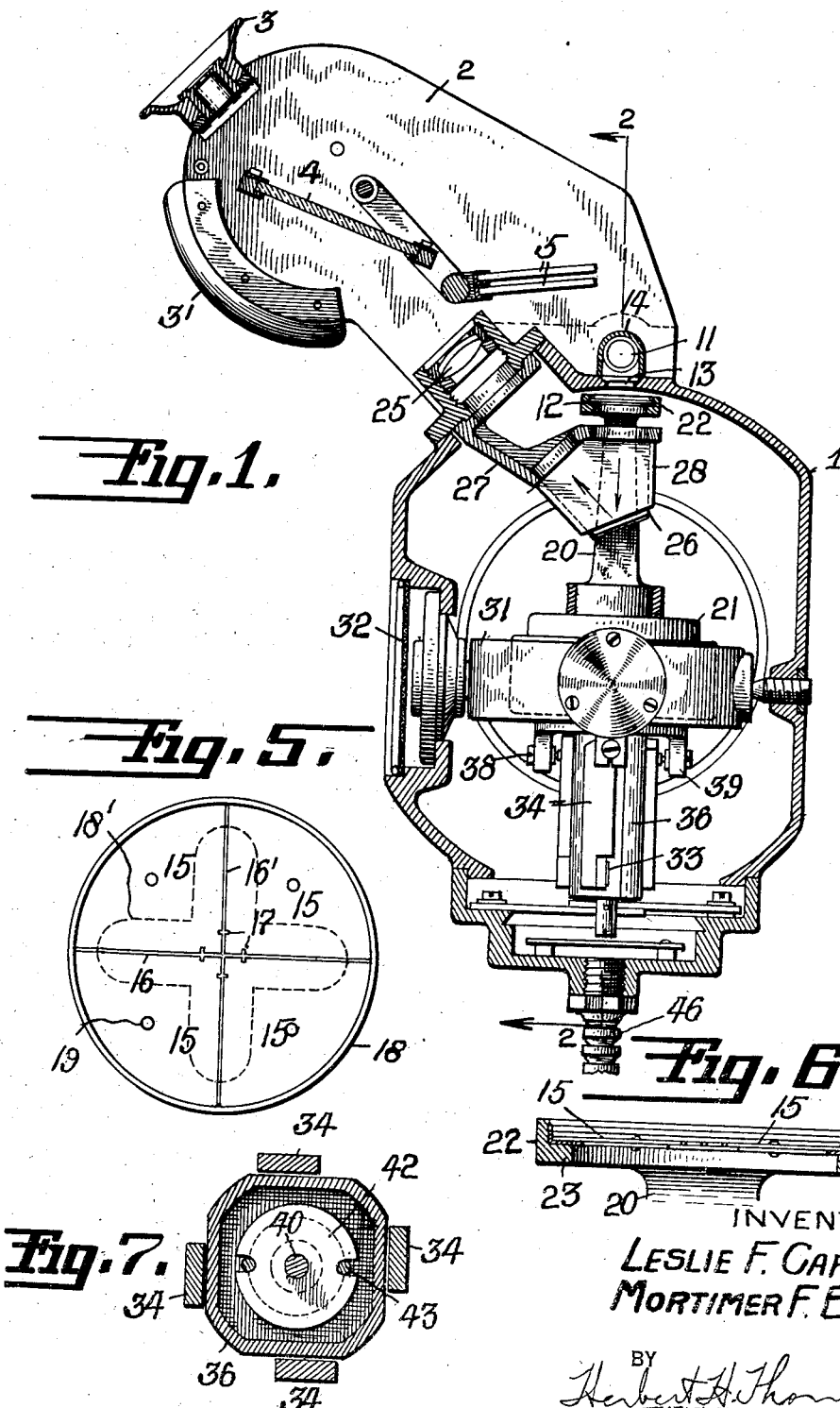

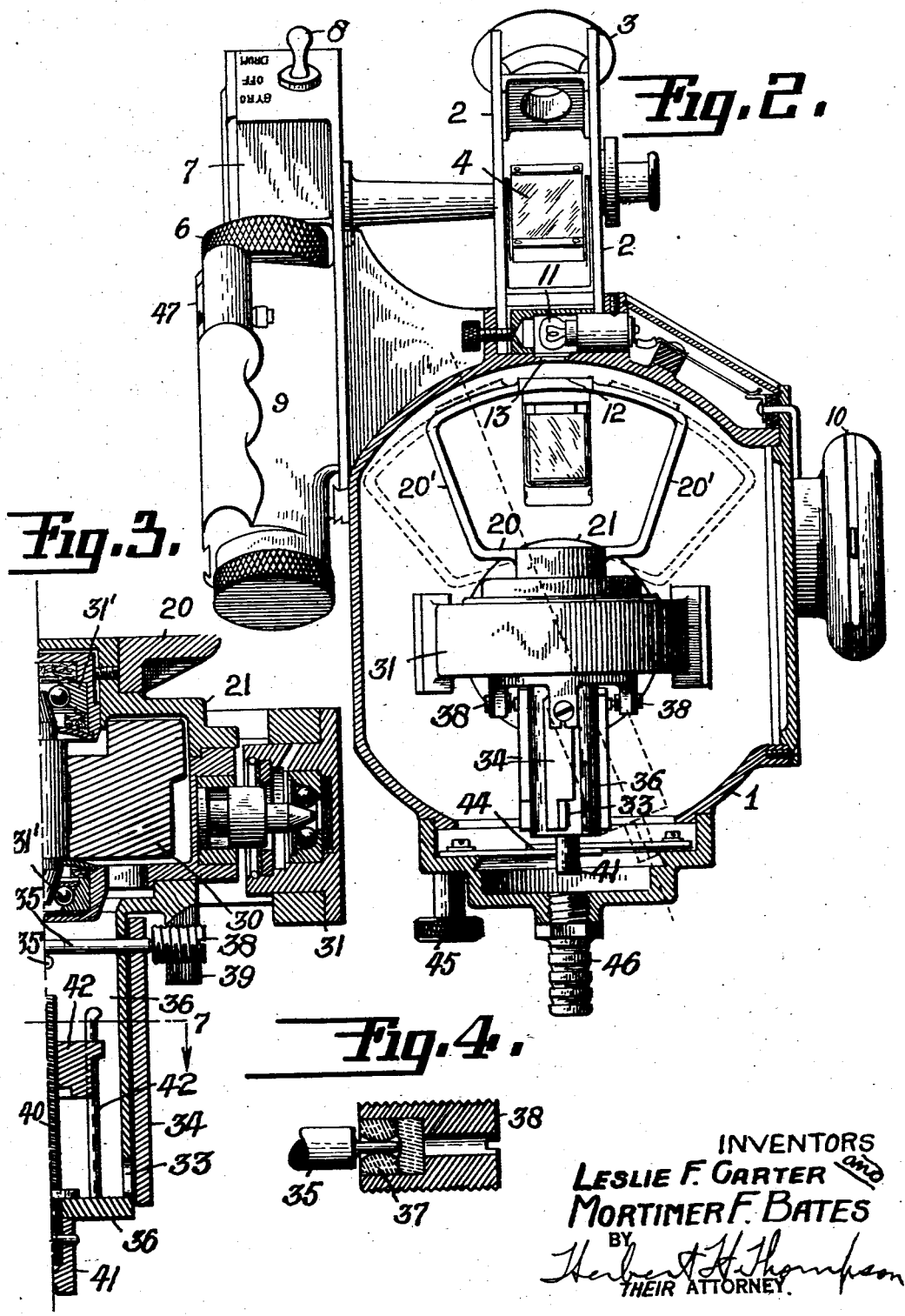

2,177,094

UNITED STATES PATENT OFFICE 2,177,094

GYRO SEXTANT

Leslie F. Carter, Leonia, N. J., and Mortimer F. Bates, Brooklyn, N. Y., assignors to Sperry Gyroscope Company, Inc., Brooklyn, N. Y., a corporation of New York Application December 11, 1936, Serial No. 115,308
Renewed March 17, 1939

10 Claims. (Cl. 33—70)

This invention relates, generally, to sextants such as are used in aerial or water navigation, and the invention has reference, more particularly, to a novel gyro sextant employing a gyroscopic horizon.

Gyroscopic horizon sextants, as heretofore constructed, have generally been extremely complicated in structure and in operation and hence have not been satisfactory in use, not only because of the tendency of the same to get out of order, but especially because of the difficulties involved in manipulating the same in use. Bubble horizon sextants have largely been used in aerial navigation because of their simplicity, but this type of sextant is not accurate owing to the fact that the bubble horizon element is acted upon, not by the gravitational acceleration alone, but by the resultant of the gravitational acceleration and whatever other accelerations may exist upon the aircraft at the instant of taking the sight. Thus, even when taking five to ten sights as rapidly as possible and averaging the readings, errors of 15 to 20 miles in determining position are common when using bubble horizon sextants in aircraft.

The principal object of the present invention is to provide a novel gyro sextant of simple, rugged and light construction that is especially suitable for aircraft and marine use, and wherein a gyroscope is used to stabilize the reticle of the optical system in a horizontal plane irrespective of the movements of the instrument housing within relatively wide limits, the said gyro sextant being easily and quickly operated in taking sights and being accurate in use owing to the presence of a stabilized artificial horizon.

Another object of the present invention lies in the provision of a novel gyro sextant of the above character wherein the gyroscope and its casing are mounted so as to be substantially non-pendulous, whereby the same are unaffected by disturbing accelerations and are responsive only to the gravitational control means provided for erecting the gyroscope at a predetermined rate when the instrument is put in use, which gravitational control means quickly erects the gyroscope without setting up oscillations in the event the same should become tilted in any direction about a horizontal axis, a caging mechanism being provided for centralizing the gyroscope in its gimbals when not in use.

Other objects and advantages will become apparent from the specification, taken in connection with the accompanying drawings wherein one embodiment of the invention is illustrated.

In the drawings:

Fig. 1 is a vertical, sectional side view of the novel gyro sextant of this invention.

Fig. 2 is a part sectional view taken along line 2—2 of Fig. 1, looking in the direction of the arrows.

Fig. 3 is an enlarged, vertical, fragmentary sectional view of a portion of the structure of Fig. 2.

Fig. 4 is an enlarged sectional view of the jewel mountings of the pendulous vanes employed for causing the erection of the gyroscope.

Fig. 5 is an enlarged plan view of the reticle.

Fig. 6 is an enlarged vertical sectional view of the reticle and its mounting, and Fig. 7 is a sectional view taken along line 7 of Fig. 3, looking in the direction of the arrow.

Similar characters of reference are used in all of the above figures to indicate corresponding parts.

Referring now to the several views of the drawings, the reference numeral 1 designates the housing of the gyro sextant or octant, to which is secured mutually spaced frame members 2 carrying the eye piece 3, the index mirror 4 and the dimmer or moderating glasses 5. The index mirror 4 is turned from a micrometer drum thumb nut 6 mounted in a casing 7 attached to housing 1. A tumbler switch 8 is mounted on casing 7 for controlling the supply of electric energy from a battery, contained within the handle portion 9, through an adjustable rheostat, contained in housing extension 10, to the reticle lamp 11 mounted on top of housing 1. The structure so far described is old and is substantially the same as that of the Bureau of Standards type of aircraft sextant or octant.

According to the preferred construction, the reticle 12 is contained within the upper portion of housing 1 so as to be illuminated by light from lamp 11 shining through a window 13 in the top of housing 1. If desired, in the daytime a shield 14 overlying the reticle lamp 11 may be removed so as to employ daylight for illuminating the reticle 12.

The reticle 12 has the form shown in Fig. 5, and consists of four similar sectors 15, preferably of thin metal, which are spaced slightly from one another at their adjacent edges to provide norrow cross slots 16 and 16' intersecting at the center of the reticle. These slots are slightly enlarged or notched at 17 at points of equal radius, conforming to the radius of the sun as projected upon the sectors 15 of reticle 12. The sectors 15 are preferably blackened so that, in use, the observer in observing this reticle merely sees crossing slits of light which pass through slots 16 and 16'. The sectors 15 are held in the mutually spaced positions shown in Fig. 5 by means of a ring or shallow pan member 18 to which the sectors 15 are secured as by rivets 19. Ring or pan member 18 has a cruciform opening 18' therein overlying the cross slots 16 and 16' so as not to obstruct the free passage of light to these slots.

The reticle 12 is carried by a loop shaped, yoke member 20 that is fixed upon, so as to extend upwardly from, the gyro casing 21. The upper central portion of the yoke member 20 is transversely enlarged to provide an annular frame 22 for receiving the reticle 12 (see Fig. 6). This frame 22 is provided with a lower stop shoulder 23 upon which the reticle 12 is held as by means of a spring ring 24. In viewing the reticle 12, the observer's line of sight passes from eye piece 3 through the transparent portion of index mirror 4, lens system 25 and prism 26, which directs the line of sight upwardly to the under surface of reticle 12, such under surface being shown in Fig. 5. The prism 26 is shown mounted in a casing 28 carried by an arm 27 attached to the housing 1, the arm 27 being angularly offset from the vertical to permit relative movement of the reticle 12 with respect thereto.

The loop shaped construction of yoke member 20 permits the prism 26 to be positioned between the limbs 20' of this yoke member. Furthermore, owing to this loop shaped construction of the yoke member 20 and to the manner of supporting the prism 26 by means of the arm 27, the instrument housing 1 may be turned as much as 20° in any direction from the vertical without disturbing the reticle 12, held in the horizontal position by the gyro casing 21 so that, regardless of the motions of the housing 1 as held by the user, the artificial horizon provided by the reticle 12 is maintained constant so long as the housing is not tilted more than 20°, which is very unlikely in use. Even if the housing should be tilted more than 20° so as to cause the inner lower portion of the same to strike a knob 41 on the lower part of the gyro casing 21, then, in that event, means is provided for causing the gyroscope to automatically erect itself at a relatively fast speed of approximately 16 minutes of arc per second. This means for erecting the gyroscope will now be described.

The gyroscope rotor 30 is mounted for rotation about a vertical axis in bearings 31' (see Fig. 3) that are carried by gyro casing 21. The rotor 30 is preferably air driven in the manner well known to those skilled in the art, and which is described in detail in the patent to B. G. Carlson, No. 1,982,636, dated December 4, 1934. The gyro casing 21 is universally mounted on a gimbal ring system 31 carried by the housing 1. Air for driving the gyro rotor 30 enters through a screen 32 (see Fig. 1) and after passing through the gimbal ring system, impinges upon the periphery of the gyro wheel 30 for driving the same. This air leaves the gyro casing 21 through the air erector slots or exhaust ports 33 that are normally half covered by the depending vanes 34 that are similar to the vanes disclosed in the above patent, with the exception that the vanes 34 are made longer and hence more sensitive than the vanes of the above patent. Furthermore, the vanes 34, four of which are employed disposed at right angles to one another, are pivotally supported at their upper end portions on jewel bearings shown in detail in Fig. 4.

Thus, two opposite vanes are fixed on the outer end portions of a transverse shaft 35 that extends loosely through apertures provided in the depending hollow portion 36 of the gyro casing 21, which hollow portion 36 has the slots or ports 33 in the lower portion thereof. The outer ends of the shaft 35 are journaled in the jewel bearings 37 that are set in nuts 38 which are adjustably threaded through depending lugs 39 provided on casing 21. Similarly, the shaft 35', carrying the two remaining vanes 34, has its ends mounted in jewel bearings provided in additional nuts 38. The vanes 34 serve to vary the openings of the exhaust slots 33 at the lower portion of the gyro casing depending portion 36 whenever the gyro is tilted in a direction about the horizontal axis. As long as the plane of the gyro wheel is horizontal, the reaction of the exhaust air is equal on all four sides of the gyro, but as soon as the plane of the gyro wheel departs from the horizontal, the pendulous vanes 34 vary the effective areas of the exhaust ports 33 so that the differential pressures set up by the exhaust air cause the gyro to precess until the plane of the wheel, and hence the reticle 12, is again horizontal.

In order that the gyro rotor and its casing 21, together with the gimbal system 31, shall be substantially non-pendulously supported so as to be unaffected directly by gravitational and other accelerating forces, the depending gyro casing portion 36 is provided centrally thereof with a vertical screw 40 which extends upwardly through the lower end of this casing portion and which may be turned by a lower knob 41. A traveling nut 42 is threaded upon the screw 40 and is prevented from turning by means of vertical rods 42' fixed within the depending portion 36 and engaging slots in the periphery of nut 42. By turning the knob 41, the nut 42 may be moved up or down to thereby nicely balance the gyro casing 21 in its gimbal supports so as to be non-pendulous therein.

A caging mechanism 44, controlled by a knob 45, is mounted within the lower portion of the gyro sextant housing 1 for the purpose of caging the gyro when the same is not in use. The caging mechanism 44 is fully disclosed in the copending application of Earl W. Chafee and Hugh Murtagh, Serial No. 618,080, filed June 18, 1932, for Bomb sights, and would appear to require no detailed description here. Air is evacuated from the housing 1 through a nipple 46 provided at the bottom thereof.

In use, an image of the reticle 12 is illuminated by means of the lamp 11 or by daylight, and the prism 26 changes the direction of the light beam, which then passes through focussing lens system 25, whereby an image of the reticle is focussed on the index mirror 4. This index mirror is then rotated by means of the thumb nut 6 so that the image of the heavenly body sighted by reflection from mirror 4 may be moved until the same is positioned in the center of the image of the reticle or on the slot 16.

The turning of thumb nut 6 to rotate the index mirror also causes the micrometer drum 47 to rotate with respect to a datum point. This micrometer drum is calibrated in angular degrees and minutes and is so related to the index mirror that when this mirror is positioned to bring the image of the heavenly body sighted into coincidence with the center of the image of the reticle on mirror 4, then the altitude of that body may be read directly from the micrometer scale on drum 47. The observer ordinarily sights the index mirror through the eye piece 3 when the heavenly body is a bright one, such as the sun or unobscured moon. On the other hand, the observer sights the heavenly body directly through the transparent portion of the mirror 4 from the position 3' when the heavenly body is faint, such as a star. As is well known to those skilled in the art, the moderating glass 5 may be interposed between the sun's rays and the index mirror, should the sun be too bright for comfortable observation.

Inasmuch as the reticle is always held truly horizontal during taking the sight, a definite and fixed horizon line is provided so that the angle of elevation of the heavenly body or bodies may be quickly and accurately noted and without appreciable error, regardless of motion of the craft on which the observer is standing.

The novel sextant of this invention is particularly valuable on aircraft, where the instrument is sure to be subjected to acceleration forces, resulting not only from gravity but from motions of the craft, which forces would throw a bubble, for example, away out of the horizontal without knowledge thereof on the part of the observer. It is well known that during banking, a bubble will remain in central or zero position, whereas the craft may be at an angle of 45° from the horizontal, so that it will be readily seen that the bubble can produce large errors which will be absolutely overcome by the non-pendulously, gyro supported reticle of this invention, which always remains truly horizontal regardless of motions of the craft within wide limits.

The long vanes 34 together with their jewel mountings provide an exceedingly sensitive means for erecting the gyroscope, so that the slightest deviation of the gyroscope from the vertical will immediately bring forth an erecting torque which will serve to quickly bring the gyroscope, and hence the reticle, back to the vertical, the speed of erection being on the order of 16 minutes of arc in one second of time.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyro sextant, a reticle arranged to be illuminated, an optical system including an eye piece and an index mirror for sighting a heavenly body, said optical system being disposed for producing an image of said reticle on said index mirror as viewed through said eye piece, and a gyroscope for supporting and stabilizing said reticle in a horizontal plane independently of said optical system, whereby a fixed reference horizon is provided for said optical system.

2. In a gyro sextant, a horizontally disposed reticle arranged to be illuminated, an optical system including an eye piece and an index mirror adjustable for sighting a heavenly body through said eye piece, said optical system being disposed for producing an image of said reticle on said index mirror as viewed through said eye piece, and a gyroscope for supporting and stabilizing said reticle in a horizontal plane independently of said optical system and within relatively wide angular limits of movement of said optical system, said gyroscope having means for quickly, automatically and directly erecting the same in the event said reticle is displaced from the horizontal by movement of said optical system beyond said limits of movement.

3. In a gyro sextant, a reticle arranged to be illuminated from above, an optical system including a light beam reflecting means positioned below said reticle, and a gyroscope mounted in substantially neutral equilibrium and having a loop shaped yoke member straddling said beam deflecting means and supporting said reticle, said yoke member enabling movement of said deflecting means without displacing said reticle or said gyroscope from the vertical.

4. In a gyro sextant, a gyroscope having means for rendering the same non-pendulous, a source of light, light beam deflecting means positioned below said source of light, and a reticle carried by said gyroscope and positioned intermediate the source of light and said beam deflecting means and stabilized about two axes by said gyroscope.

5. In a gyro sextant, a gyroscopically supported reticle comprising four opaque sectors having their adjacent radial side edge portions slightly spaced for defining intersecting light slits.

6. In a gyro sextant, a gyroscopically supported reticle comprising four opaque sectors having their adjacent radial side edge portions slightly spaced for defining intersecting light slits extending at right angles to each other, and a ring member to which said sectors are secured.

7. In a gyro sextant, an optical system including an eye piece and an index mirror for sighting a heavenly body, a reticle disposed in said optical system, a substantially non-pendulous gyroscope for supporting and stabilizing said reticle about two axes, whereby the center of said reticle may be made to coincide with the image of the heavenly body, and erecting means on said gyroscope for rapidly precessing the same directly to erected position in event the same should depart therefrom.

8. In a gyro sextant, an optical system including an eye piece and an adjustable index mirror for sighting a heavenly body, a horizontally extending reticle disposed so that its image as viewed through said eye piece is focussed on said index mirror, a vertical substantially non-pendulous gyro having said reticle supported on its gyro case so that said reticle is stabilized about two horizontal axes extending at right angles to each other, whereby the center of the image of said reticle may be made to coincide with the image of the heavenly body, means for rendering said gyro non-pendulous, and erecting means on said gyro for rapidly precessing the same directly to erected position in event the same should depart therefrom.

9. In a gyroscopically stabilized sighting device, a rotor having a normally vertical spin axis, a casing therefor having a downward hollow projection, air ports therein operating as an erection device, pendulous shutters pivoted adjacent said ports on the outside of said projection, a threaded shaft within said projection and having the bottom portion extending through the same, whereby the shaft may be turned, a weight threaded on said shaft, means for preventing the turning of the weight so that said weight may be raised and lowered to balance the gyroscope, and a reticle secured to said casing to be stabilized thereby.

10. A gyro sextant as claimed in claim 5, wherein the spaced adjacent radial side edge portions of said opaque sectors have cooperating notches equidistant from the intersection of the light slits so formed.

LESLIE F. CARTER.
MORTIMER F. BATES.

DISCLAIMER 2,177,094.—*Leslie F. Carter*, Leonia, N. J., and *Mortimer F. Bates*, Brooklyn, N. Y. GYRO SEXTANT. Patent dated October 24, 1939. Disclaimer filed February 1, 1940, by the assignee, *Sperry Gyroscope Company, Inc.*

Hereby enters this disclaimer to claim 1 in said specification.

[*Official Gazette February 27, 1940.*]